Patented Oct. 22, 1940

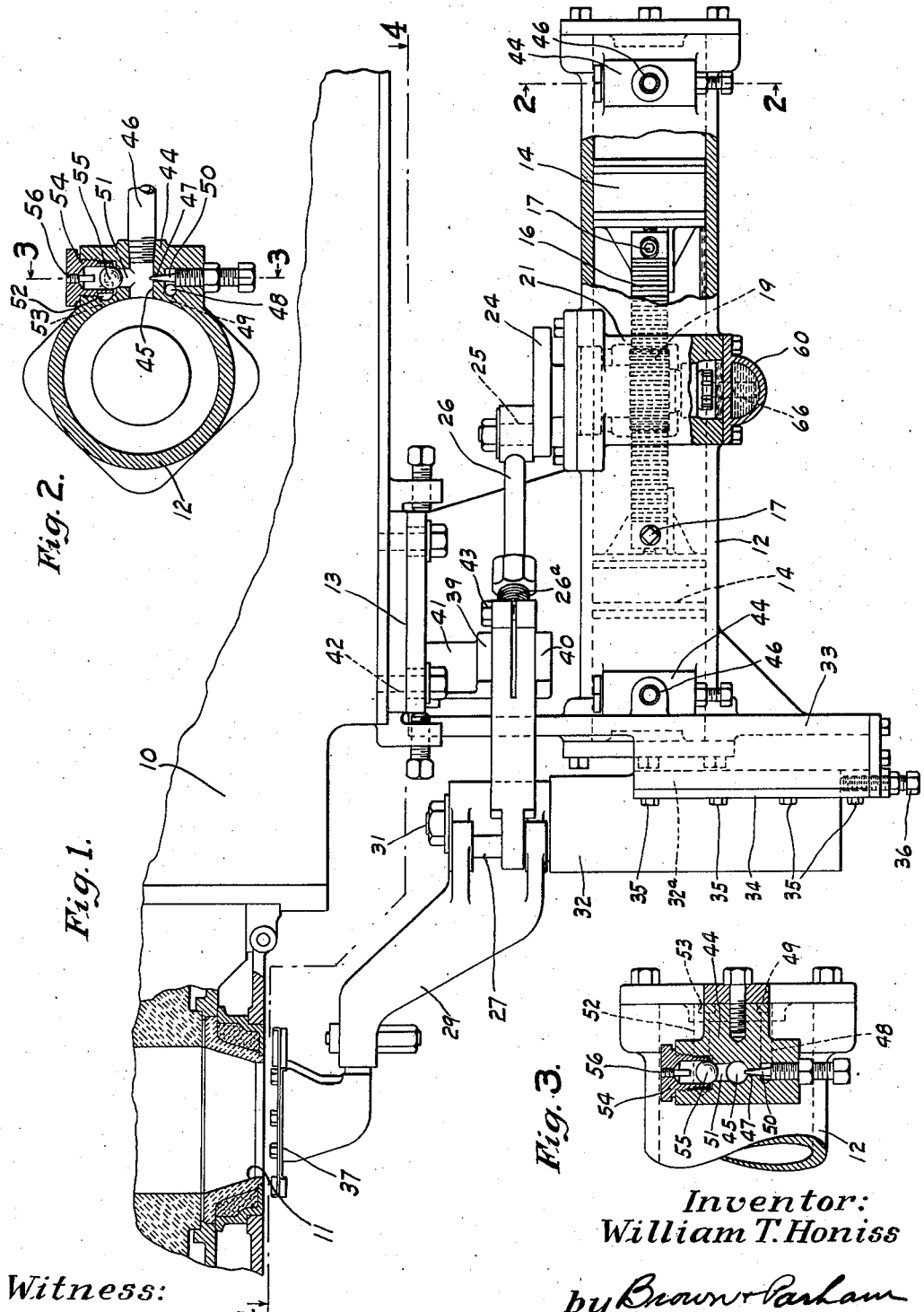

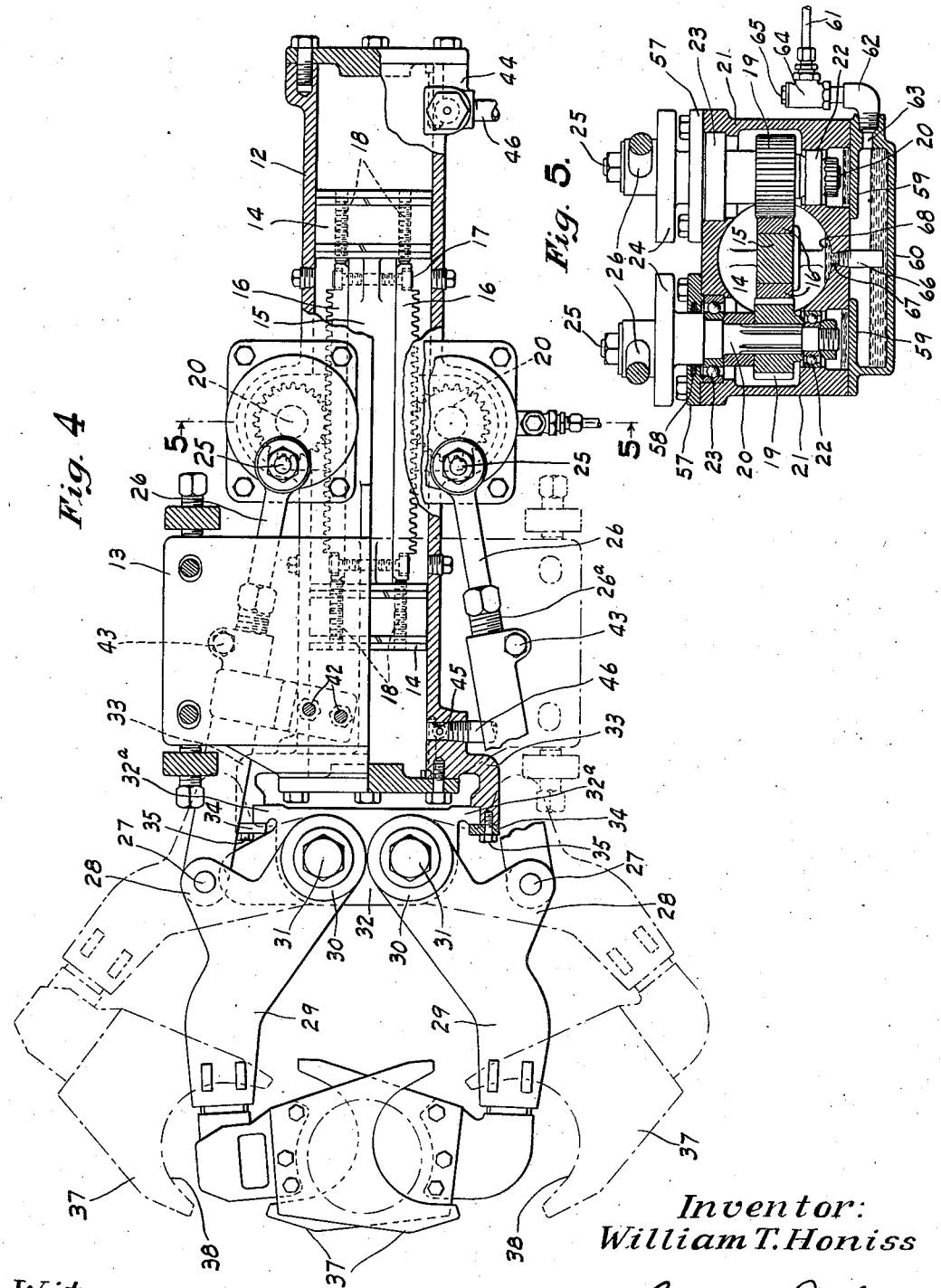

2,218,970

UNITED STATES PATENT OFFICE 2,218,970

MOLTEN GLASS SEVERING MECHANISM

William T. Honiss, West Hartford, Conn., assignor to Hartford-Empire Company, Hartford, Conn., a corporation of Delaware Application April 25, 1938, Serial No. 204,088

2 Claims. (Cl. 49—14)

This invention relates to improvements in mechanisms for severing molten glass and more particularly to a severing mechanism having cooperative shear blades operatively connected with the piston of a fluid-pressure actuated motor for severing mold charges from successive masses of molten glass in suspension from the outlet of a glass feeder.

An object of the invention is to improve the glass cutting action of a severing mechanism of the character above described by providing the shear blades of such a mechanism with fluid-pressure actuated connections operable to cause the blades to cut through the molten glass mass to be severed more rapidly and powerfully than would be practical with any prior fluid-pressure actuated molten glass severing mechanism.

A further object of the invention is to reduce to a minimum the time of necessary contact of the blades of a molten glass severing mechanism of the character described with a pendant column or mass of molten glass through which the shear blades cut to sever a charge therefrom.

A further object of the invention is the provision of a molten glass severing mechanism of the character described which will be reliable in use, relatively simple in construction, not likely to get out of order easily, and generally of high efficiency.

A further object of the invention is the provision in a severing mechanism of the character described of an improved means for lubricating relatively moving frictionally contacting adjacent surfaces and parts of the mechanism.

A further object of the invention is the provision in a severing mechanism of the character described of a novel construction and arrangement of parts for effecting splash lubrication of the relatively moving parts of the fluid actuated motor and adjacent motion transmitting elements of the severing mechanism.

Prior glass severing mechanisms of the fluid pressure actuated type produce closing and opening movements of the shear blades of such mechanisms by alternate strokes of the fluid actuated pistons of the mechanisms in opposite directions. In other words, the piston of the fluid-pressure motor of such a mechanism is moved for a complete stroke in one direction to close the blades and for a complete stroke in the opposite direction to open the blades. Such an operation has objectionable features and faults which are inherent in the structure employed. If sufficient power is applied to the piston to cause the blades to cut rapidly completely through the glass being severed, then excessive slamming of moving parts of such a mechanism against a stationary stop or stops has been practically unavoidable. This in turn is detrimental to the bearings and connections of the mechanism and tends to disturb the alignment of the shear blades and to interfere with satisfactory delivery of the severed glass charges. Attempts have been made to obviate such excessive slamming of parts by decelerating the speed of the piston and hence of the shear blades as such blades cut through the glass with a view to halting the movements of the piston and hence the movements of the shear blades and connecting parts at the instant of completion of severance of the glass. In practice, however, it is extremely difficult, if not impossible, accurately to balance the fluid pressure or pneumatic force acting on the piston and the inertia of the parts moved by the piston against the variable resistance of suspended masses or columns of molten glass. Deceleration of the closing movements of the shear blades has sometimes caused failure of the shear blades completely to sever the glass and militates against clean and satisfactory severance of charges from suspended glass columns or masses of relatively large diameter. Also, the shear blades remain in contact with glass of the column or mass being severed for an undesirably long time, particularly since the opening movements of the shear blades are relatively slow for their initial portions.

A severing mechanism of the present invention obviates or overcomes the above pointed out and other objectionable features and faults of prior severing mechanisms of the pneumatic or fluid pressure actuated type.

In carrying out the invention, I provide a mechanism having a fluid-pressure motor comprising a piston operatively connected with a pair of shear blades and movable in a cylinder so that the piston is about at the middle of a complete stroke in one direction at the time the blades are closed for a glass severing operation and the opening of the blades is effected by continued movement of the piston in the same direction. In other words, each complete stroke of the piston of the pressure-fluid motor of my improved molten glass severing mechanism effects both closing movements and reverse or opening movements of the cooperative shear blades of such mechanism. This improved arrangement of fluid actuated operating parts obviates the necessity of attempting to provide a delicate balance of forces at the end of the cutting operation and thus avoids the necessity of decelerating the speed of movements of the shear blades as they cut through the glass and of course also obviates the necessity of accelerating the movements of the shear blades as they open after a cutting operation.

Since instantaneous change of direction of movement of fluid under pressure at the ends or either end of the cylinder is not required at the time of a glass severing operation by my improved severing mechanism, relatively simple control means may be employed for controlling the supply and exhaust of pressure fluid to and from the cylinder. In practice, it is therefore possible to dispense with various valves which are commonly used in the fluid-pressure lines of prior fluid-pressure severing mechanisms.

Other objects and advantages of the invention will hereinafter be pointed out or will become apparent from the following description of a practical embodiment of the invention, as shown in the accompanying drawings, in which:

Figure 1 is a view, mainly in side elevation but having portions broken away and other portions shown in vertical section, showing my improved severing mechanism operatively applied to a glass feeder, only a fragmentary portion of the feeder being shown;

Fig. 2 is a section through an end portion of the cylinder of the improved severing mechanism, the view being taken along the line 2—2 of Fig. 1, showing one form of fluid-pressure control mechanism which I may employ to check the stroke of the piston in the cylinder at the end of such stroke;

Fig. 3 is a fragmentary view of the fluid pressure control mechanism at the end of the cylinder, the view being taken along the line 3—3 of Fig. 2, looking in the direction of the arrows;

Fig. 4 is a section substantially along the line 4—4 of Fig. 1, showing the improved severing mechanism mainly in plan with a portion of the cylinder of the severing mechanism in horizontal section; and Fig. 5 is a section through the fluid pressure motor of the improved severing mechanism, taken substantially along the line 5—5 of Fig. 4 and showing particularly novel means for lubricating the piston and adjacent moving parts of the mechanism.

A glass feeding forehearth is partially shown at 10 in Fig. 1. This forehearth is provided with a glass feed outlet 11. In practice, molten glass (not shown) may issue from this outlet in a depending column or mass from which charges are to be severed by severing mechanism of the present invention.

As shown, the improved severing mechanism comprises a cylinder 12 suspended beneath the feeder forehearth, as by being attached to the forehearth casing by a suitable adjustable attaching mechanism 13. The cylinder 12 is of relatively great length in comparison with its bore and with cylinders of glass charge severing fluid-pressure actuated severing mechanisms heretofore employed. A piston within the cylinder may comprise a pair of spaced head sections 14, Figs. 1 and 4, connected by an intermediate web or shank 15 to reciprocate in unison in the cylinder. The connecting web or shank 15 between the sections 14 of the piston carries a pair of rack bars 16 which preferably are secured to the opposite sides thereof by suitable adjustable fastening means. As best seen in Fig. 4, such fastening means may comprise screws or cap bolts 17 extending through slightly elongated openings in the rack bars 16 and screwed into lateral threaded openings in the web or neck to clamp the rack bars to the piston web or neck 15. Adjusting screws 18 are threaded through the sections 14 of the piston against the opposite ends of the rack bars 16 and may be actuated when the screws or cap bolts 17 have been loosened to adjust the rack bars 16 longitudinally in either direction to a slight, but adequate, extent. The purpose of this adjustment is to assure proper coaction of the teeth of the rack bars with cooperative pinions 19 which are to be driven by the rack bars as they are reciprocated with the piston in the cylinder 12.

The pinions 19, short vertical shafts 20 on which they are mounted, and bearings for such shafts, are located in gear boxes or housings 21 which, as best seen in Fig. 5, may constitute integral lateral enlargements of the middle portion of the cylinder 12. As shown in detail for the left hand shaft 20 in Fig. 5, each shaft 20 supports its associate pinion 19 between a lower anti-friction bearing unit or assembly 22 and an upper cooperative anti-friction bearing unit or assembly 23. Each shaft 20 protrudes from the upper end of its housing 21 and carries a crank disk 24 having thereon a crank pin 25 pivotally connected with an end portion of a link 26. The opposite end of each link 26 is pivotally attached, as by means of a short pivot pin 27, Figs. 1 and 4, to out-turned ears or short arms 28 on pivoted shear arms 29.

The shear arms 29 have their inner end portions or hubs 30 mounted on vertical pivot pins or shafts 31 which are carried by a block 32. In the particular construction shown, the block 32 has flanges 32a secured in adjusted position in a vertical slideway, which comprises a pair of cooperative slideway members 33 integral with the forward end portion of the cylinder 12 and cooperative cap plates 34 secured to the slideway members 33 by cap bolts 35. The block 32 may rest upon one or more vertical adjusting screws, one of which is shown at 36 in Fig. 1, by which such block may be adjusted vertically in its slideway when the cap bolts 35 have been loosened. The particular adjustable means for pivotally supporting the shear arms 29 does not per se form part of the present invention and any suitable arrangement of parts for effecting this result may be employed. In practice, the mounting for the shear arms 29 should be such as to permit sufficient relative vertical adjustment between these arms in addition to vertical adjustment of both arms to assure proper co-action of the shear blades on such arms to sever charges of molten glass at a predetermined distance below and in axial alignment with the feeder outlet. Such mountings, in various forms, are well known in the glass feeding art.

The shear arms constitute movable carriers for cooperative shear blades. The shear blades, such as those designated 37 in Fig. 4, may be secured in place on the outer ends of the shear arms by any suitable means, as by holders like those employed in the shear mechanism of the well known "Hartford-Empire single feeder." The shear blades have V-notched or concavely curved cutting edges. Those shown have substantially semi-circular cutting edges, indicated at 38. The arrangement is such that the shear blades will overlap when closed to cut through a column or mass of glass in suspension from the outlet 11 at a predetermined adjustable distance below the outlet and so that the cutting action of the blades will be completed at the axial line of the outlet.

The links 26 are connected with the shear arms so that the shear arms will be swung about their pivots by the links but may be adjusted vertically without vertically displacing the links. As shown, the outer end portions of the links 26 have openings through which the pins 27 connecting the links with the shear arms extend. Vertical adjustments of the shear arms will cause vertical movements of the pins 27 in the openings at the outer end portions of the links 26. To steady the links 26, particularly when vertical adjustments of the shear arms 29 are being made, upper and lower stop or movement limiting members 39 and 40 may be provided above and below each of the links 26, as shown in Fig. 1. These members may be integral arms of a bracket 41 which may be secured to the casing of the overhead forehearth structure, as by means of bolts 42, Figs. 1 and 4. The effective length of the links 26 may be adjusted to adjust the overlap of the shear blades when such blades are closed. As shown, each of the links 26 includes a screw threaded intermediate section 26a, in the nature of a turn buckle, which can be turned when a clamping screw 43 in an adjacent portion of the link has been loosened, to adjust the effective length of the link.

The cylinder 12 is provided with means at each of its opposite ends for supplying fluid under pressure, which may be compressed air, to that end of the cylinder at the proper time and for exhausting such fluid therefrom at another time. As best seen in Figs. 2, 3 and 4, each end portion of the cylinder is provided at one side with a laterally enlarged wall 44. This wall is bored transversely at 45 at a predetermined distance from the end of the cylinder to provide a pressure fluid intake passage with which pipe 46 is connected. The intake passage 45 communicates through a relatively small vertical needle valve port 47 with a passage 48, which extends longitudinally in the wall 44 toward the end of the cylinder and communicates with the interior of the cylinder at the extreme end thereof at 49. An adjustable needle valve 50 controls the communication between the passage 45 and the passage 48. The air intake passage 45 also communicates through a vertical passage 51 with another longitudinal passage 52 which also extends toward the end of the cylinder and communicates with the interior of the cylinder at the extreme end thereof at 53. The passage 51 is enlarged to receive the casing 54 of a check valve assembly of the ball valve type. The ball valve is indicated at 55 and is adapted to open upwardly or away from the air intake passage 45 to an extent which may be regulated by the adjustable ball valve stop pin 56. The pipe 46, connected with the passage 45, is the usual part of a pressure system by which fluid under pressure is both supplied to and exhausted from a cylinder with which the pipe is connected, the times of these operations being controlled by a suitable timer (not shown) in a way and for purposes which are well understood in the glass feeding art. Thus, when pressure fluid, such as air, is supplied to the pipe 46 at either end of the cylinder 12, and the inner end of the passage 45 at that end of the cylinder is closed by the piston, such fluid will enter the cylinder through the needle valve controlled port 47 and ball valve controlled port 51. The initial movement of the piston toward the opposite end of the cylinder thus will be controlled by the rate at which the pressure fluid is supplied to the extreme end of the cylinder or back of the piston. In the particular arrangement shown, the combined areas of the passages controlled by the needle valve 50 and ball valve 55 may be substantially equal to the diameter of the main air passage 45 so that the piston may be started on its movement from the end of the cylinder toward the opposite end thereof at a relatively rapid rate. However, if desired, these valves may be adjusted so as to cause a relatively slow starting movement of the piston which will be accelerated when the piston clears the inner end of the main air intake passage 45. On the return movement of the piston, in response to the pressure of fluid that has been delivered to the opposite end of the cylinder, the exhaust of pressure fluid will be substantially reduced when the piston blocks off the inner end of the passage 45 which is now serving as an exhaust passage. Thereafter, the exhaust of the confined pressure fluid in advance of the moving piston will be restricted to such fluid as may pass through the passage controlled by the needle valve 47 from the extreme end of the cylinder and thence to the pipe 46. The speed of the piston thus will be checked or retarded and cushioned when the piston approaches either end of the cylinder. The particular construction shown for accomplishing this result may be replaced by any other suitable known mechanism for effecting a like result, as such mechanism does not per se form part of the present invention.

The gear housings 21 are closed at their tops by coverplates 57 which may be apertured to accommodate the hubs of the crank disks and may have packing, as at 58 in Fig. 5, around such hubs. The bottoms of the gear housings are closed by plates 59 which may constitute inwardly extending flanges at the top of a shallow oil reservoir or container 60 beneath the portion of the cylinder that is provided with the gear housings 21. This reservoir or container 60 communicates with a pressure fluid pipe 61 through suitable pipe fittings which may include an elbow 62 connected with a bore 63 in the side wall of the reservoir 60 and a T member 64 having a free upper end normally closed by a plug 65. At the beginning of operations of the improved severing mechanism, the plug 65 may be removed and an appropriate amount of oil introduced into the reservoir 60 through the filler member 64. When the severing mechanism is placed in operation, air or other fluid under pressure may be applied through the pipe 61 to cause part of the oil in the reservoir 60 to be forced upwardly therefrom through a riser pipe 66 to and through a port 67 in the bottom of the cylinder 12, preferably at a place intermediate the length of the cylinder and between the gear housings 21. Thus, oil from the reservoir 60 may stand within the cylinder 12 between the sections 14 of the piston, as indicated at 68 in Fig. 5. The reciprocation of the piston in the cylinder will splash this lubricant onto the rack bars, gears, and bearings in the cylinder and adjacent housings 21, so that all these relatively moving contacting parts will be kept bathed in lubricant. Such lubricant as runs downwardly from the gears and bearings into the lower portions of the gear housings 21 may accumulate therein until the level of such lubricant reaches the communicating openings between the gear housings and the interior of the cylinder 12. On cessation of operations, the fluid pressure on the oil or lubricant in the reservoir 60 may be relieved to permit oil or lubricant to drain from the cylinder back through the pipe 66 into the reservoir, thus avoiding leakage of oil past the sections of the piston and from the ends of the cylinder when the device is out of use for any lengthy period. An advantage of the particular lubricating means just described is that there is no necessity of injecting oil into the air or fluid supplied to the motor of the device, as is usual, and hence oil vapor is not continuously exhausted into the atmosphere where men are working.

It will be observed that, in operation, the shear blades are closed when the piston is approximately midway of its stroke in either direction. The power developed by the piston will be greatest at that time so that the shear blades will be closed at the greatest speed and with maximum force. Also, at the time the piston is at the middle part of the stroke in either direction, the crank pins and links are approaching toggle positions. This would prevent any appreciable amount of lost motion in the shear arms if there were any backlash in the rack and pinion teeth. Moreover, the pinions and rack bars are meshing very rapidly at this time, thereby tending to reduce pressure on the teeth and effect of backlash.

Since the blades are closed and opened by a continuous movement of the piston in the same direction, the duration of contact of the shear blades with the molten glass is minimized and harmful effects of such a contact are eliminated or substanitally reduced. Also, since each stroke of the piston in either direction both closes and opens the shear blades, it is entirely feasible to provide means at the ends of the cylinder for gradually bringing the piston and the parts actuated thereby to a stop as the shear blades are then open. Consequently, there is no necessity of employing stop members against which moving parts of the mechanism must strike with considerable force to effect the required cessation of movement of the shear blades as in prior fluid-pressure actuated severing mechanisms.

The invention is susceptible of embodiment in forms differing widely in details of construction from that which is shown in the drawings. The invention may be usefully employed in severing materials other than glass.

I claim:

1. In a fluid pressure actuated glass severing mechanism, a cylinder, a pair of gear housings at the sides of said cylinder in open communication with the interior of the cylinder, vertical shafts and gears in said housings, bearings for the shafts in said housings, a piston reciprocable in the cylinder, rack bars carried by said piston in mesh with said gears, an oil reservoir located beneath said cylinder and in communication at its top with the interior of the cylinder midway between said gear housings, and means for forcing oil from said reservoir upwardly into said cylinder to position to be splashed by said piston onto said rack bars, gears, shafts and bearings as said piston reciprocates in said cylinder.

2. In a fluid pressure actuated glass severing mechanism, a cylinder, a pair of gear housings at the sides of said cylinder in open communication with the interior of the cylinder, vertical shafts and gears in said housings, bearings for the shafts in said housings, a piston reciprocable in the cylinder, rack bars carried by said piston in mesh with said gears, an oil reservoir located beneath said cylinder, an open ended riser pipe depending into said oil reservoir and in communication at its top with the interior of the cylinder midway between said gear housings, and means for forcing oil from said reservoir upwardly into said cylinder to position to be splashed by said piston onto said rack bars, gears, shafts and bearings as said piston reciprocates in said cylinder and for permitting return of oil from the cylinder through said riser pipe to said reservoir during a period of inactivity of said mechanism.

WILLIAM T. HONISS.